July 21, 1964 S. SCHNEIDER 3,141,999

COOLING OF MODULAR ELECTRICAL NETWORK ASSEMBLIES

Filed June 8, 1959 3 Sheets-Sheet 1

INVENTOR.
STANLEY SCHNEIDER
BY H. Walter ...
AGENT

COOLING OF MODULAR ELECTRICAL NETWORK ASSEMBLIES

Filed June 8, 1959

INVENTOR.
STANLEY SCHNEIDER
BY H. Walter [signature]
AGENT

July 21, 1964 S. SCHNEIDER 3,141,999

COOLING OF MODULAR ELECTRICAL NETWORK ASSEMBLIES

Filed June 8, 1959 3 Sheets-Sheet 3

INVENTOR.
STANLEY SCHNEIDER

BY H. Walter Perry

AGENT

United States Patent Office 3,141,999
Patented July 21, 1964

3,141,999

COOLING OF MODULAR ELECTRICAL NETWORK ASSEMBLIES

Stanley Schneider, Newtown Square, Pa., assignor to Burroughs Corporation, Detroit, Mich., a corporation of Michigan Filed June 8, 1959, Ser. No. 818,648
10 Claims. (Cl. 317—100)

The invention hereinafter described and claimed has to do with electrical network assemblies, and more particularly to the high density modular packaging of such networks in miniature assemblies.

High density packaging of electronic systems is being achieved, in part, by the development of small components, such as, transistors, diodes, capacitors, etc. However, such components in themselves do not meet complete miniaturization system requirements. Circuit interconnection and undesirable heat transfer among components are problems which also must be solved in parallel with the development of such components.

The fact that components can be made physically smaller does not imply that the power necessary for proper circuit operation would become proportionately less. Except for the change in energy used by line inductance and stray capacitance, the required power input in a given circuit is unchanged as long as signal and impedence levels remain unchanged. Therefore, dissipation of the heat resulting from the operation of these miniaturized networks is a very real problem. Then too, as the total packaging volume is decreased in the designing of such miniaturized assemblies, the available surface area for interconnection of components and for the dissipation of the heat is decreased, thus making the solving of these problems more difficult.

An important object of the present invention is to provide a modular electrical network assembly of miniature size which overcomes the disadvantages of the above-mentioned design factors by providing a construction facilitating circuit interconnection and affording rapid dissipation of the heat resulting from energization of the assembly.

Another object of the invention is to provide such a unique assembly which is substantially immune to thermal and physical shock, and to other environmental conditions.

It is also an important object of the invention to provide a miniaturized modular package design for electrical systems having extremely low volume and high density of hermetically sealed electrical components.

Another object is to provide a unitized modular construction for electrical networks which reduces the technical level required of assembly and maintenance personnel.

More specifically, it is an object of the present invention to provide such a miniaturized modular electrical network assembly which is characterized by its simplicity of design, its rugged construction, and its ease of assembly and maintenance.

In accordance with the above objects and first briefly described, the present invention comprises a miniaturized modular electrical network or system assembly consisting of a plurality of similar miniature circuit sub-assemblies or module units nested around a heat exchanger and enclosed in a housing providing means on its exterior surfaces for easily interconnecting the sub-assemblies into an electrical network assembly, the leads of which terminate on the exterior of the assembly in position for connection to associated apparatus. Terminals for the leads are preferably of the pin type positioned at one end of the assembly for plugging the assembly into a socket connector.

A more complete understanding of the invention may be had from the following detailed description and by reference to the accompanying drawings in which.

While the invention is capable of expression in other forms and other electrical networks, the preferred form herein illustrated and described in detail has been selected as best illustrating the basic inventive concept. Briefly described, it comprises a modular electrical network or system assembly (FIG. 2) including a plurality of hermetically sealed sub-assemblies (FIG. 7), each comprising a separate and complete circuit constructed essentially as a flat wafer, or chip, having two major dimensions with exposed component leads extending from edge portions thereof. These wafers are stacked together in angular housing members (FIG. 6) with the exposed wafer leads extending through the walls of the housing members and into electrically conductive relation with circuitry preferably printed on the exterior surfaces of the housing members (FIG. 3). Four such wafers are assembled together to form a stack of square cross-section (FIG. 4) and of any desired length (FIGS. 5 and 6) thus to form an electronic system or modularized electrical network assembly having three major dimensions (FIG. 2).

All of the components are hermetically sealed on the inside of the assembly while all of the interconnections between the sub-assembly units or wafers are on the outside surfaces. Each sub-assembly unit in the assembly is provided with a quarter-circle notch on its innermost corner (FIG. 7) which, as seen in FIGS. 4 and 5, cooperate to form a hole extending axially through the assembly to accommodate a heat exchanger preferably in the form of a metallic tube having integral radially extending fins, preferably one at each end and one between each adjacent pair of stacked units and in heat exchange relationship with the opposed major faces of the wafer sub-assembly units.

Figures 1, 2, 3, 4, 5, 6:
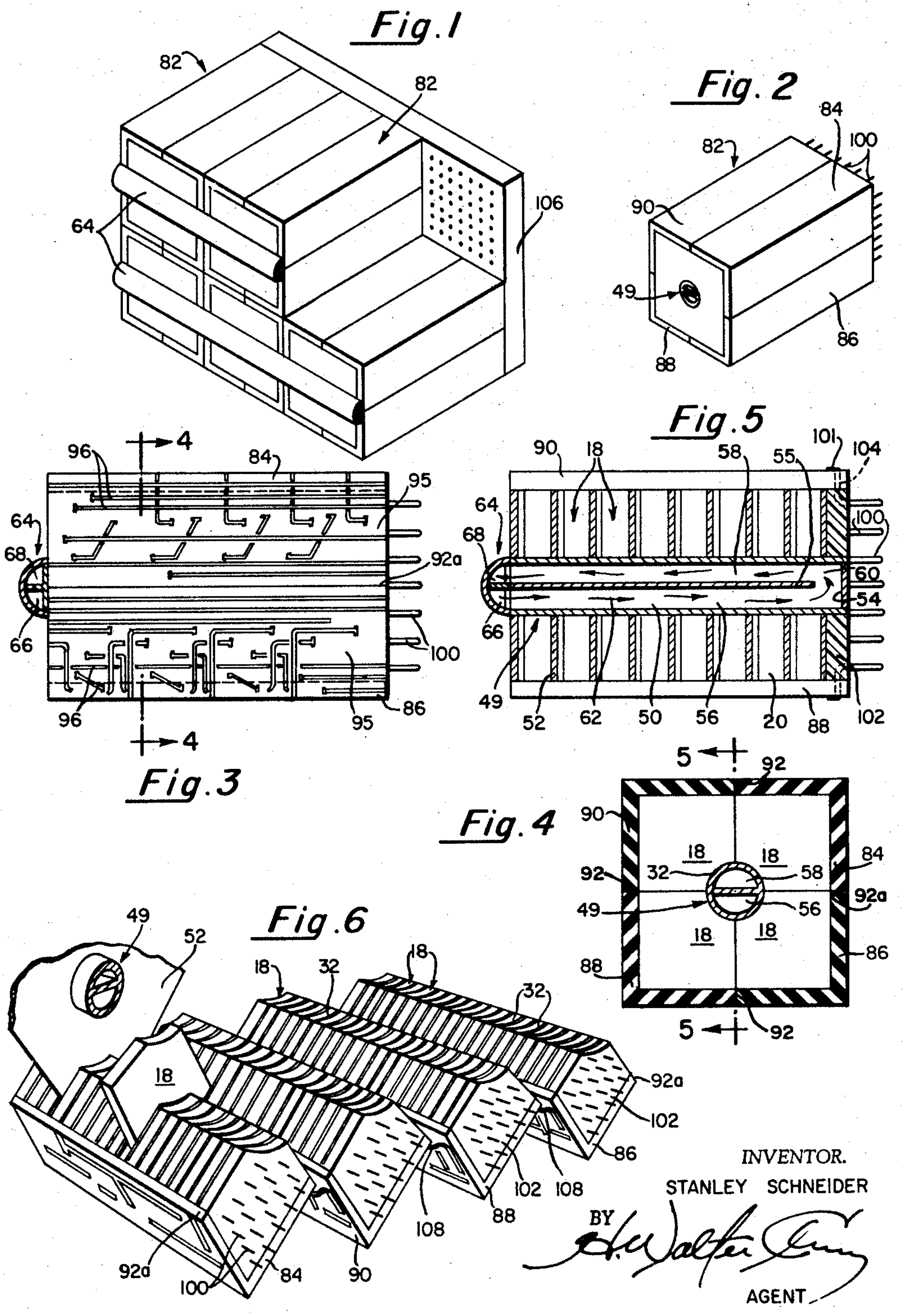
FIG. 1 is a perspective view of apparatus including a plurality of electrical network assemblies in accordance with the present invention.
FIG. 2 is a perspective view of a single modular network assembly in accordance with the invention.
FIG. 3 is a side elevational view of the unit of FIG. 2.
FIG. 4 is a sectional view taken along the line 4—4 of FIG. 3.
FIG. 5 is a sectional view taken along the line 5—5 of FIG. 4.
FIG. 6 is a perspective view of an assembly opened up as if for servicing or assembling.

Some of the printed circuit conductors on the exterior face of adjacent housing elements may be interconnected by resilient or flexible conductors (FIG. 6) while others terminate at pin type terminals positioned at one end of the assembly (FIGS. 3 and 5) for plug-in connection to associated apparatus (FIG. 1).

The heat resulting from energization of the assembled system network is picked up by the fins across the minimum dimension of the wafer, almost at its source, and is carried by the fins to the tube where it is conducted away by a heat transfer medium such as cooled circulating gas (FIG. 5).

Now more specifically, and with reference to the details of the drawings, FIG. 1 illustrates an assembly of the modular network assemblies in accordance with the invention. However, for a clearer understanding of the details of this preferred form of the invention, the following description will begin with the smallest unit, the module wafer 18, illustrated in FIGS. 7 and 8. As shown here, the unit comprises a thin shell 20 of tray-like configuration including a bottom wall 22 and upstanding side walls 24, 26, 28 and 30. Each unit is provided with a quarter-circle notch 32 where walls 24 and 30 meet, the purpose of which will be more fully explained hereinafter. The bottom wall 22 of the module is provided with raised portions or bosses 34, having recesses 35 in their top surfaces for facilitating the positioning of minature electrical components 36 within the module.

These components may be naked transistors, diodes, capacitors, resistors etc. and may be of the leadless type, in which case suitable leads 38 are provided for connecting the components in circuit and to terminals 40 projecting from side walls 26 and 28. These leads may be formed in a number of ways. They may be of the printed circuit type, or formed by a conductive paint, or even partially of both types. Alternatively the components may be of the type normally provided with leads. In the latter case the leads 38 may be extended through the walls 26 and 28 to project outwardly therefrom. It will be noted that in this form of the invention all of the leads have their terminal ends projecting from walls 26 and 28 parallel to each other and at 45° to their respective side wall.

In manufacturing this unit, the tray 20 preferably is molded of a suitable electrically insulating material, and as a unitary piece with terminal slots 44 spaced along walls 26 and 28 for the terminals of component leads 38. If desired, a plurality of such terminals may be pre-molded in the walls thus to provide ready connection for the leads, only the necessary number being used, those remaining unused being "dead." In fact, all the leads may be preformed and molded in place for connection to the components. The components 36 and their leads 38 are then assembled in the module by dropping the components in the recesses 35 provided in raised portions 34. Their leads are then connected to form the desired circuit and certain terminal ends are threaded through the slots 44, as described above, or connected to terminals already provided in the walls, as the case may be. A suitable moisture resistant potting compound 46, such as epoxy resin, is poured into the tray completely filling it to an extent level with the tops of the side walls. After the potting compound has set, a cover member 48 is suitably secured over the tray and sealed to the tops of its side walls. While other materials may be equally suitable, it is proposed to manufacture the tray and its cover of glass.

Figure 7:
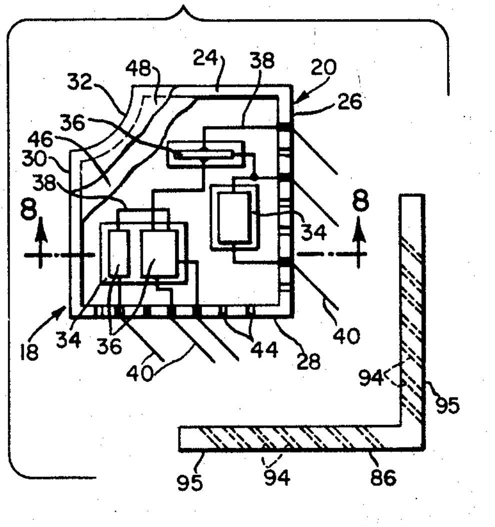
FIG. 7 is a plan view of a typical module unit of the network assembly with parts broken away and showing a simplified circuit, by way of example.

Referring now to FIGS. 3, 4 and 5, it can be seen how a plurality of the above-described module units are used in the modular network assembly which may, for example, comprise a complete "arithmetic register" for a computer, including a series of flip-flop and diode logic circuits, each comprising one of the above-described module units. The particular circuit construction shown in the module of FIG. 7 is to be considered by way of example only, and not as exemplifying either a flip-flop or a diode circuit although it may be either, or some other circuit entirely.

Figure 13:
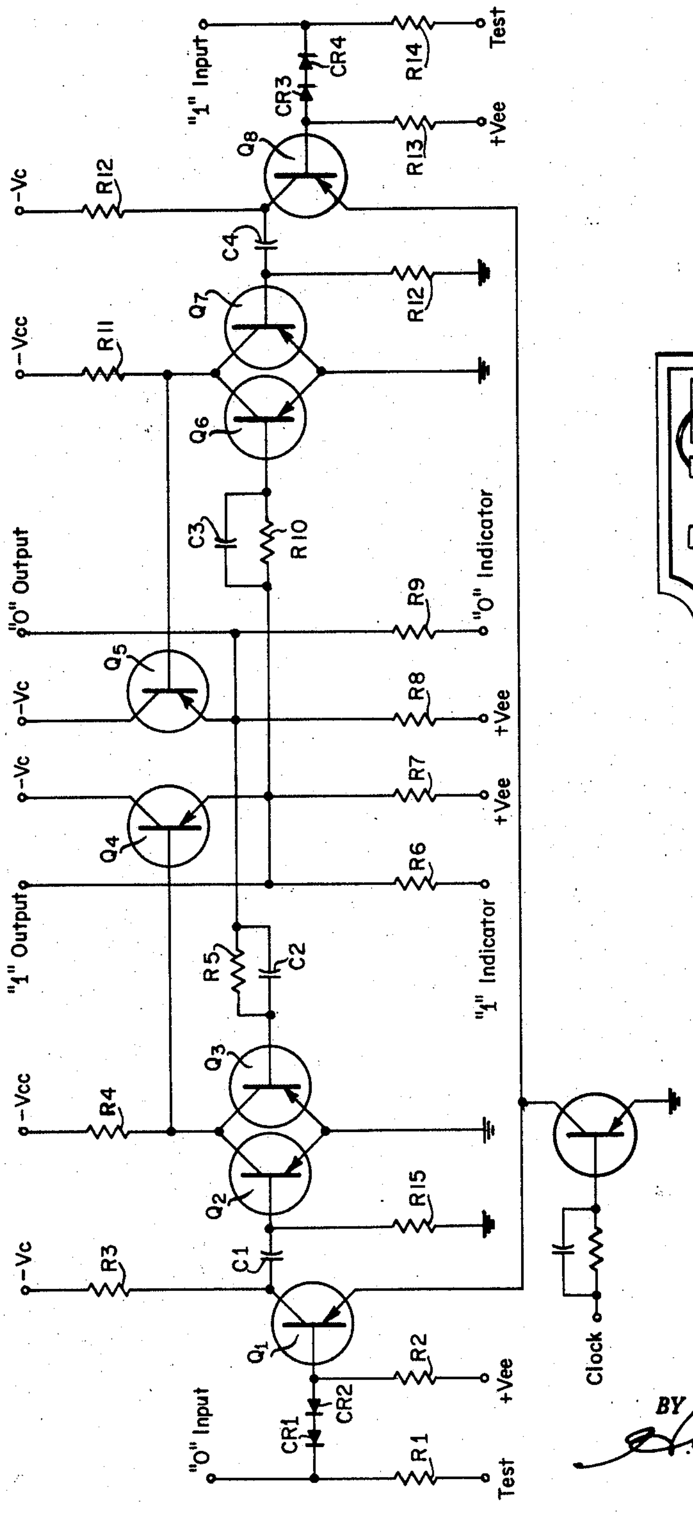
FIG. 13 is a diagram of a typical flip-flop circuit which may be housed in a miniature module of the type shown in FIG. 7.
Figure 14:
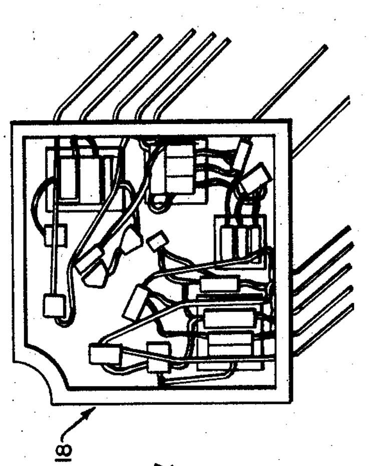
FIG. 14 is a plan view of a module such as shown in FIG. 7, but showing the components of the flip-flop circuit of FIG. 13 packaged therein.

By way of a more concrete example, a complete flip-flop module has been illustrated in FIGS. 13 and 14. FIG. 13 is a diagram of a typical flip-flop circuit, the components of which are packaged in a module unit, such as above-described, but in the manner shown in FIG. 14. It is also of interest to note that the large number of components used in this circuit have been packaged in a module unit the exterior dimension of which, as shown in FIG. 14 on a greatly enlarged scale, is in the order of one inch square with a negligible depth of 0.10″. It is understood, of course, that with such a large number of components, there may be insufficient room to provide a recess 35 for each. Therefore, it is contemplated that some components may be stacked on others.

Figure 8:
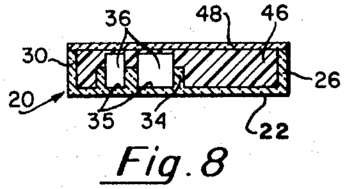
FIG. 8 is a sectional view taken along the line 8—8 of FIG. 7.

One of the important advantages of this module construction is that components such as diodes, transistors, etc. may be packaged into the tray without their usual individual housings, and all simultaneously hermetically sealed in the tray by the potting compound 46 and cover 48, FIG. 8, thus to effect a considerable saving in volmetric requirement for these individual components, not to mention the monetary saving, which would be considerable. A disadvantage of course, as pointed out above, resides in the small area available for circuit interconnection and for the dissipation of the heat. However, these difficulties are overcome by the construction now to be described.

Referring again to FIGS. 2, 3, 4 and 5, it is seen that the modules 18 are arranged or nested around a heat exchanger 49 including in this form of the invention, a tubular member 50, and a plurality of radially extending fins 52. The tube 50 extends axially through the assembly in the aperture formed by joining four of the modules 18 in a plane, as shown in FIG. 4, with the notched corners 32 in the center.

As shown in FIG. 5, a plurality of these planar quartets of modules 18 are assembled along the tubular member 50 in stacked relationship with a fin 52 between each quartet of modules, and one at each end. Tube 50 has its end closed, as indicated at 54, and is divided by a partition 55 into two passages or ducts 56 and 58 interconnected by a passageway 60 adjacent end wall 54 thereof. While the heat exchanger 49 provides other assets, such as a strengthening backbone for the assembly, its primary purpose is to dissipate the heat generated during the time these assemblies are energized. The heat of the modules 18 is picked up by the fins 52 across the least dimension of the module and therefore substantially at the source of the heat. The fins conduct the heat to the tube 50 from which it is removed by a cooling fluid, such as cool gas, circulated through the passages 56 and 58 of the tube, as indicated by the arrows 62.

The cooling gas may be introduced into the tube 50 and the heated gas removed therefrom in any suitable manner, such as by the manifold 64, also shown in FIGS. 1 and 3, which is divided into inlet and exhaust passageways 66 and 68 respectively. As seen in FIG. 5, inlet and outlet passages 66 and 68 are in open communication with ducts 56 and 58 of tube 50, respectively. Any suitable means, not shown, may be used to supply the cooled gas, but this apparatus is of such a conventional nature that it was thought unnecessary to illustrate it here.

Figure 9:
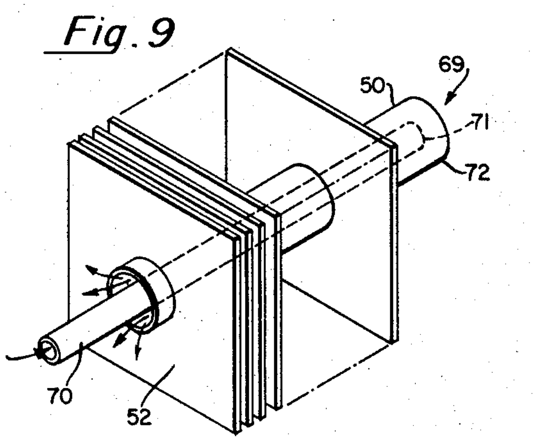
FIGS. 9, 10 and 11 are perspective views showing alternative forms of heat exchangers for the assembly.
Figure 10:
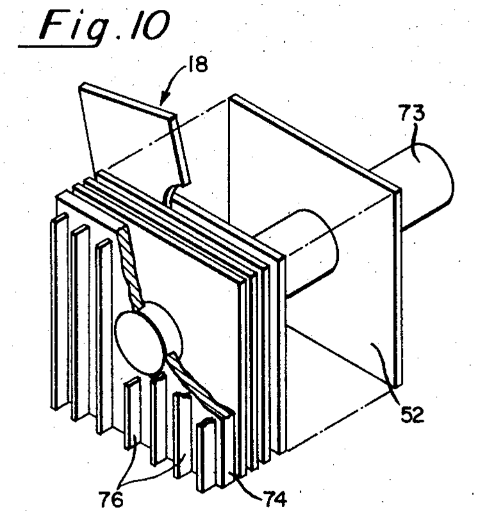
Figure 11:
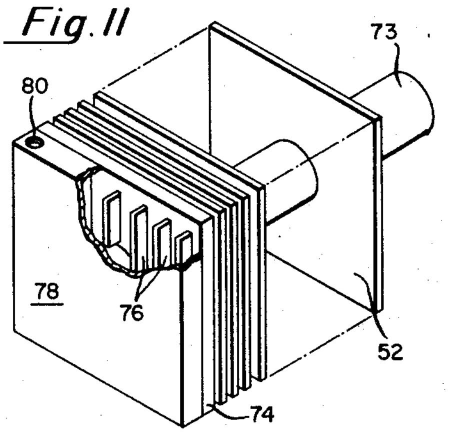

While in this preferred form of the invention, the heat exchanger means has been illustrated as a hollow tube 50, it is understandable, of course, that other suitable forms may be used for this purpose. In this regard, attention is directed to FIGS. 9, 10 and 11, illustrating suitable modifications. For example, as shown in FIG. 9, instead of the tube being divided by a partition, as described above, the fluid inlet to the tube 69, shown here, may be by way of a smaller diameter co-axially positioned tube 70, having its end 71 terminating adjacent to, but short of the outer end 72 of the tube. In the alternative form shown in the FIG. 10, the tube is replaced by a solid metal rod 73. The outer fin 74 is this form is provided with a plurality of fins 76 extending in parallel directions across its outer face, thus to dissipate the heat to the ambient atmosphere. Still further, as shown in FIG. 11, the outer fin 74 may be provided with a chamber 78 enclosing its outer face and fins 76. The chamber is provided with a vent 80 and when the assembly is energized the chamber 78 is filled with a volatile fluid to take up the heat conducted to the fin 74 through the rod 73 and fins 52.

Again with reference to FIGS. 2 through 5, it will be seen that the stacked assembly of modules 18 with its heat exchanger 49 is enclosed by a housing 82 comprising four angle members 84, 86, 88 and 90 (FIG. 4) arranged respectively in clockwise order around the assembly and suitably joined along their parallel adjacent edges, indicated at 92 and 92*a*, either permanently by cement, or alternatively by hinge pins, not shown, whereby the module may easily be opened up, as shown in FIG. 6, for servicing. Incidentally FIG. 6 shows a greater number of modules 18 stacked in the housing elements than shown in FIG. 5, thus to illustrate its flexibility in including more or less subassemblies, as required.

For assembling the modules 18 with its associated angular housing member, it is seen in FIG. 7 that the housing member 86 is provided with a plurality of angularly positioned openings 94 aligned with leads 40 extending angularly from the side walls 26 and 28 of the module, whereby the module and the housing member may be brought together in a manner permitting the leads 40 to extend through the slots 94 to the outer surfaces 95 of the housing member.

As seen in FIG. 3 the outer surfaces 95 of the angular housing members 84, 86, 88 and 90 are provided with conductors 96 preferably of the printed circuit type. When the various modules 18 are assembled in a housing member, as described above, these conductors 96 cooperate with leads 40 to interconnect the modules 18 in a system network forming, for example, and as mentioned above, an arithmetic register for a computer. The ends of leads 40 may provide "plug-in" connectors to the conductors on the housing walls, but in this embodiment they are bent into engagement with the printed conductors and soldered thereto, as by dip soldering or by other suitable methods. The conductors 96 on the housing walls have been shown only in FIGS. 3 and 6 but it should be understood that they would appear on FIGS. 1 and 2, being left off of these figures for clarity of illustration.

So that the module, as now assembled, may be adapted for plug-in connection to associated apparatus, as shown in FIG. 1, certain of the conductors 96 on the exterior walls of the housing terminate at one end of the housing, the right end as shown in FIG. 3, where they are interconnected with terminal pins 100 projecting from end wall members 102 (FIG. 5). This connection may be made in any convenient manner, however, as shown here, the pins have their inner ends 101 terminating along an outer edge portion of wall 102, as shown at 104, where they extend through the housing members and into contact with the desired printed circuit conductors.

It is evident from the above description that a plurality of the basic modular network assemblies may be plugged into associated apparatus, as represented by the panel 106 in FIG. 1, and in closely adjacent relationship whereby common cooling means may be associated therewith, manifold 64, for example.

While it is possible to so design the assembly whereby conductor interconnection from one angular housing member to the other is unnecessary, in the present instance it is desired to interconnect certain of these conductors. Preferably such interconnection, as shown in FIG. 6, is by means of resilient or flexible connectors 108. However, to facilitate servicing the assembly, such interconnection has been omitted at the joint indicated by the numeral 92*a* on FIG. 6. By terminating the leads on these angled housing members at this joint it is possible to open up the module as shown in FIG. 6 without destroying any of the necessary interconnecting leads or wires.

In assembling the complete system, the units 18 may first be assembled around the heat exchanger 49, or alternatively the units 18 may first be assembled in their respective housing member, after which the heat exchanger may be assembled therewith by inserting the fins 52 between the units 18 in one housing member, as indicated by the fragmentary portion in FIG. 6, then folding the other three stacks around the heat exchanger.

Another feature of the heat exchanger in the assembly is that the fins 52, by judicious choice of metal from which the heat exchanger is fabricated, may be used as a shield between components in adjacent wafer modules when necessary.

Figure 12:
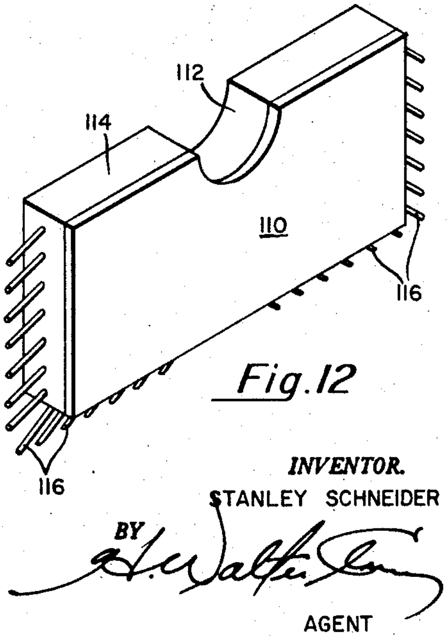
FIG. 12 is a perspective view of a modified form of the module unit shown in FIG. 7.

FIG. 12 shows a possible modification of sub-assembly module design wherein the unit 110 is the size of two of those described above and the heat exchanger notch 112 is of semi-circular shape and is provided intermediate the ends of one of its longer edges 114. Terminal leads 116 project from the other edges in the same opposite directions as when two units 18 are similarly joined.

From the above it is seen that the present invention provides a basic modular electrical network assembly of miniature size completely fulfilling the needs of the industry for a miniaturized electronic system providing a complex network of electrical circuit components, preferably hermetically sealed, in a minimum of area, yet providing for easy interconnection of the components and rapid removal of the heat generated by the assembly when energized.

What is claimed is:

1. A miniaturized modular electrical network assembly comprising, a rectangular housing formed by four angle members of electrically insulating material joined along parallel edges thereof, electrical conductors on the external surfaces of said members, a plurality of rectangular wafer-like hermetically sealed circuit sub-assemblies stacked in each of said housing members and having edge portions abutting edge portions of adjacent sub-assemblies in other of said housing members, each of said sub-assemblies having exposed terminals extending therefrom and through its associated housing member and into electrically conductive contact with selected conductors on its housing member, the innermost corner of each of said rectangular sub-assemblies being notched to form an axial opening through the assembly, and a metallic heat exchanger positioned within said axial opening, said heat exchanger having thin integral fins extending between and in heat exchange relationship with opposing surfaces of said sub-assemblies whereby heat generated when said network is energized is transferred through the fins to the heat exchanger and to the exterior of said assembly.

2. A construction according to claim 1 wherein said assembly is provided with pin terminals on one end thereof, and wherein certain of said conductors on said housing members are interconnected and others terminate in electrically conductive contact with said terminal pins.

3. A miniature electronic network assembly comprising, a heat exchanger comprising an elongated member having a plurality of outwardly extending fins, a plurality of circuit sub-assemblies each hermetically sealed in a thin wafer-like casing having two substantially flat major surfaces, all of said sub-assemblies being nested around said elongated member with their major surfaces in intimate heat transfer relation with said fins, whereby the heat generated by said sub-assemblies when energized is transferred across the minimum dimension of said casings to said fins which conduct the heat to said elongated member, and means interconnecting said circuit sub-assemblies in a system network.

4. A construction according to claim 3 wherein said heat exchanger includes a solid metallic rod.

5. A construction according to claim 4 wherein said rod is provided with a finned portion exposed to the ambient air.

6. A construction according to claim 5 wherein said finned portion is provided with a vented chamber for receiving a volatile cooling fluid.

7. An electrical network assembly comprising, a housing of electrically insulating material, electrical conductors on the housing walls, a plurality of spaced substantially flat circuit sub-assembly units within said housing, said units having leads extending into electrically conductive contact with said housing conductors, and a heat exchanger having first substantially flat portions each sandwiched between and in substantial contact with adjacent ones of said sub-assemblies within said housing, thus to pick up the heat generated by said sub-assemblies while energized, and a second portion arranged to remove said heat to the exterior of said assembly.

8. A construction according to claim 7 wherein said heat exchanger includes a hollow metallic tube through which a cooling fluid may be circulated.

9. A construction according to claim 8 wherein said hollow tube is divided by an elongated partition into two interconnected passageways.

10. An electronic network assembly comprising, a heat exchanger comprising an elongated member having a plurality of outwardly extending fins, a plurality of substantially flat circuit units having two substantially parallel major surfaces, all of said units being nested around said elongated member with their major surfaces in intimate heat transfer relation with said fins, whereby the heat generated by said units when energized is transferred to said fins across the dimension between said major surfaces, said fins conducting the heat to said elongated member, and means interconnecting said circuit units in a system network.

References Cited in the file of this patent

UNITED STATES PATENTS

| | | |
|---|---|---|
| 2,692,961 | Fondiller | Oct. 26, 1954 |
| 2,766,409 | Parrish | Oct. 9, 1956 |
| 2,796,559 | Feucht | June 18, 1957 |
| 2,815,472 | Jackson | Dec. 3, 1957 |
| 2,816,253 | Blitz | Dec. 10, 1957 |
| 2,843,806 | O'Neill | July 15, 1958 |
| 2,889,493 | Scal et al. | June 2, 1959 |
| 2,901,893 | Saltzman | Sept. 1, 1959 |
| 2,906,103 | Saltzman | Sept. 29, 1959 |
| 2,912,624 | Wagner | Nov. 10, 1959 |
| 2,958,013 | Ansley | Oct. 25, 1960 |
| 2,986,679 | Storsand | May 30, 1961 |